May 12, 1970
A. S. TAYLOR ETAL
3,510,933
APPARATUS AND METHOD FOR CONTINUOUSLY FORMING
INTRACUTANEOUS INJECTORS
Filed May 26, 1967
7 Sheets-Sheet 1
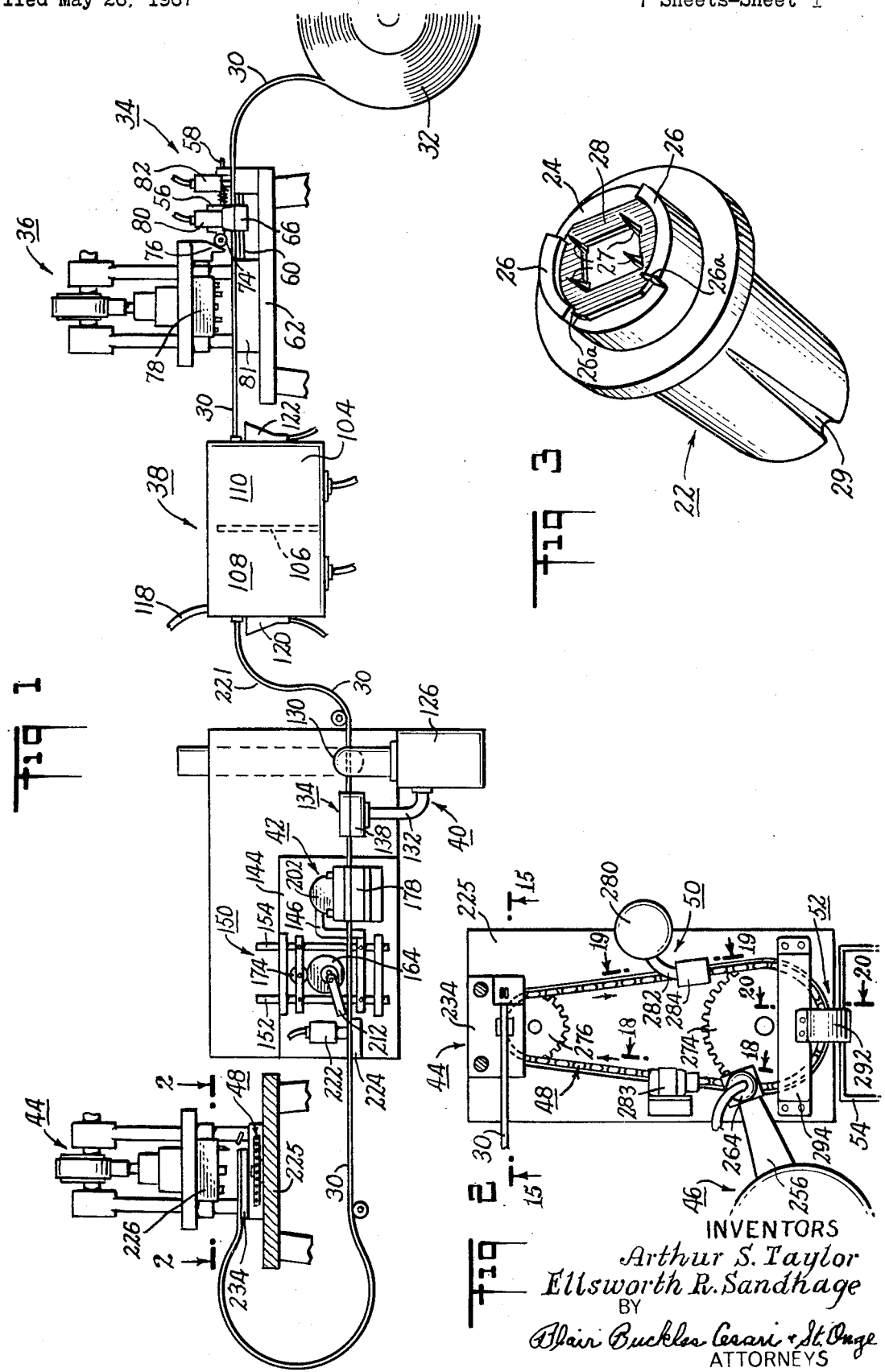
INVENTORS
Arthur S. Taylor
Ellsworth R. Sandhage
BY
Blair Buckles Cesari & St.Onge
ATTORNEYS

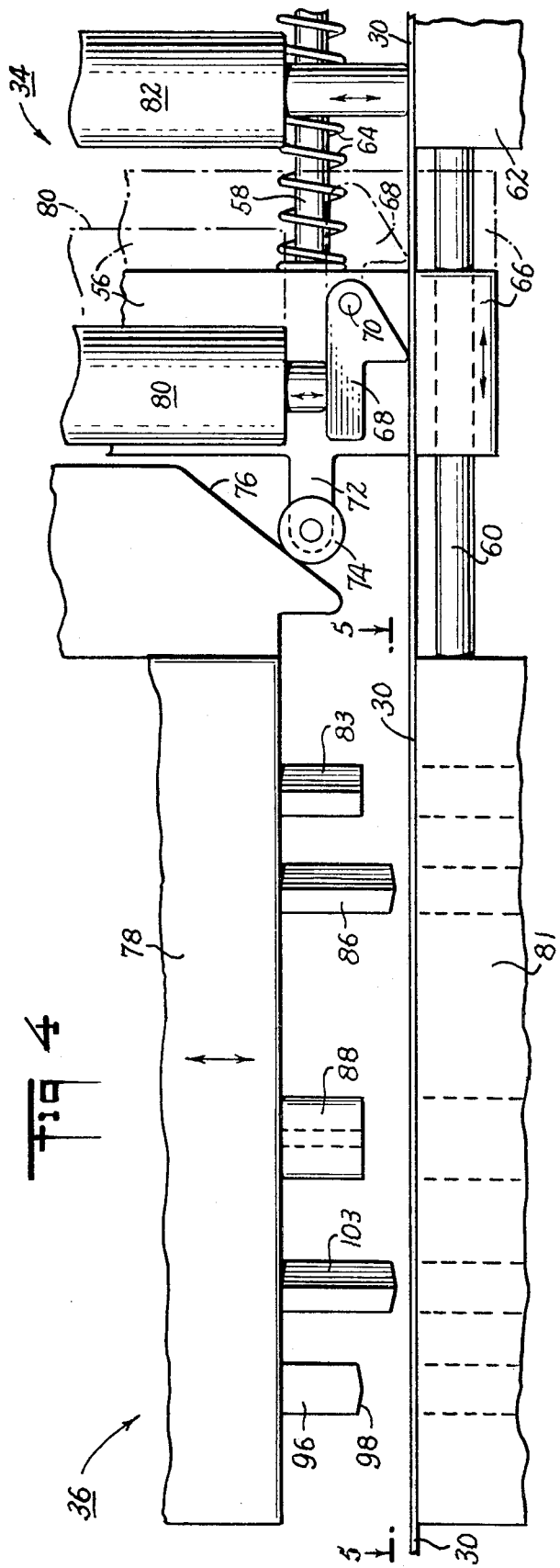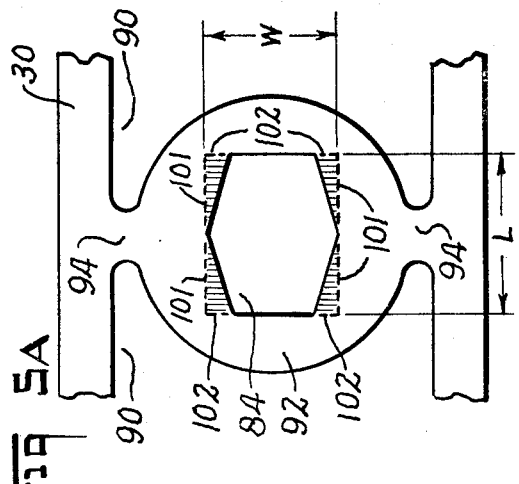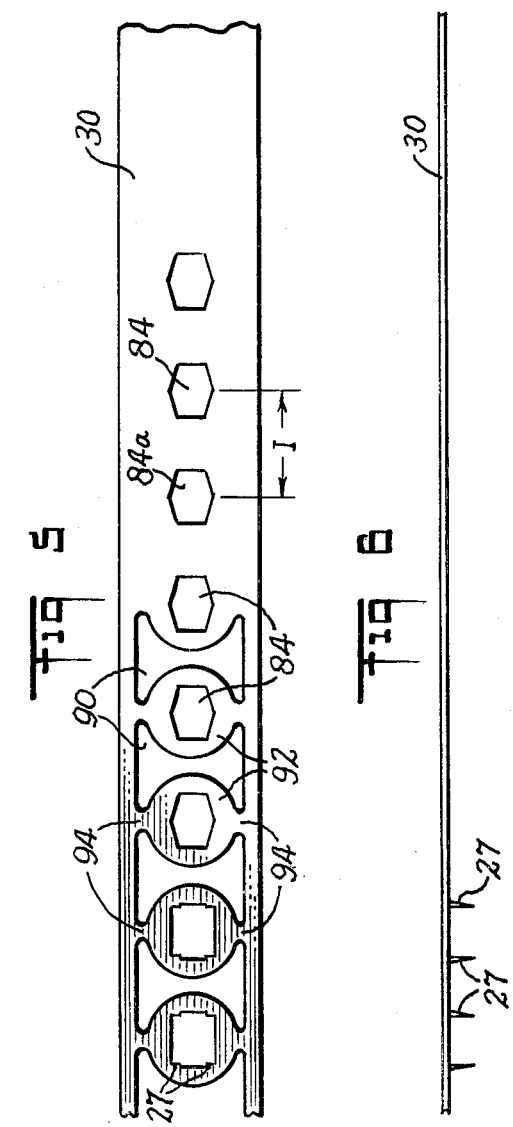

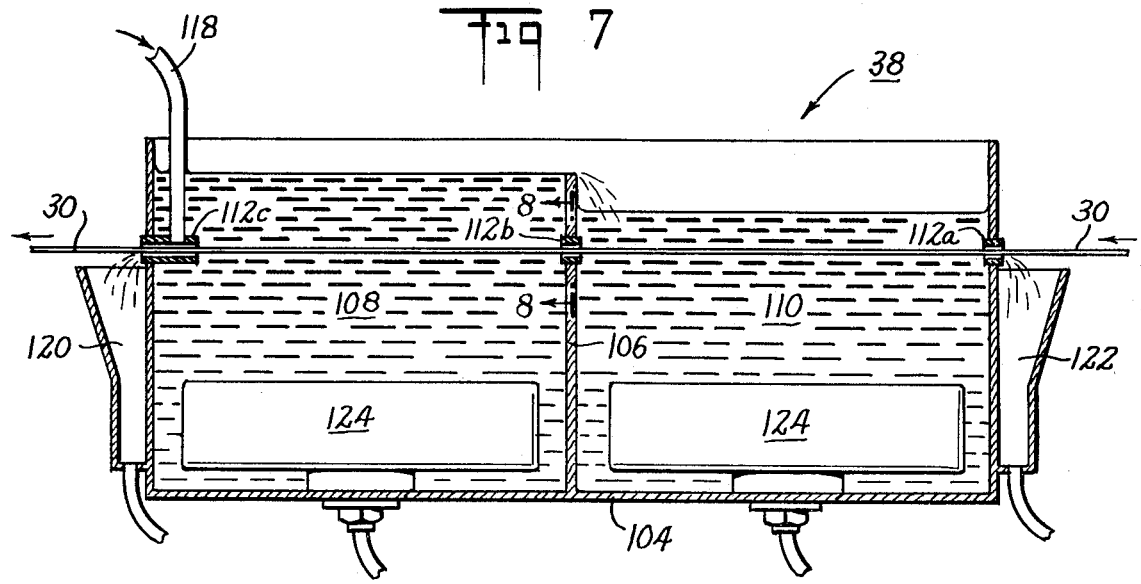
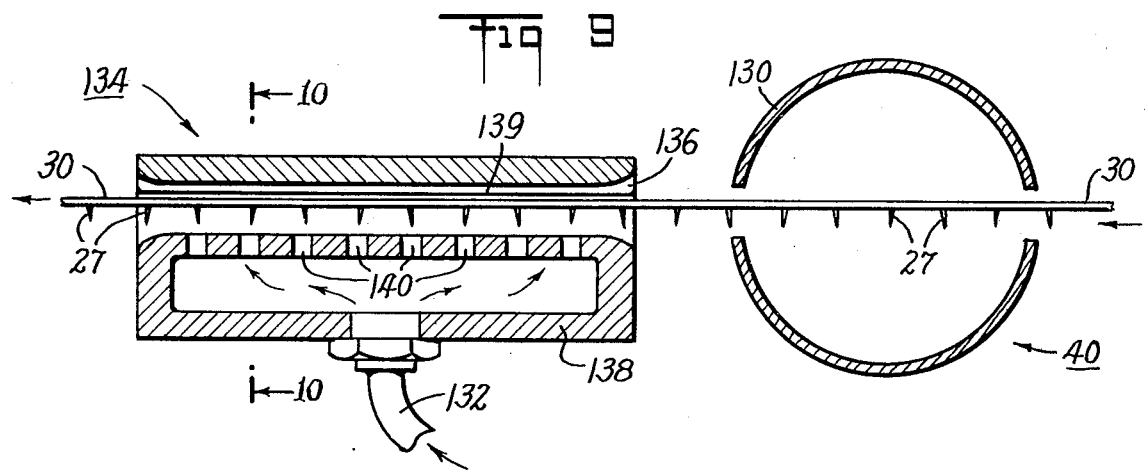
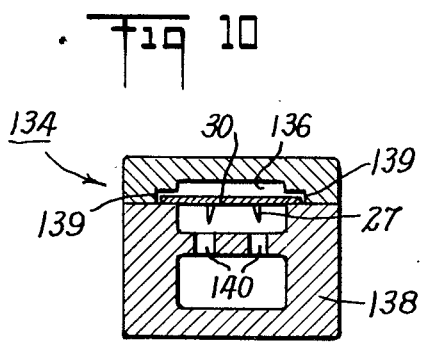
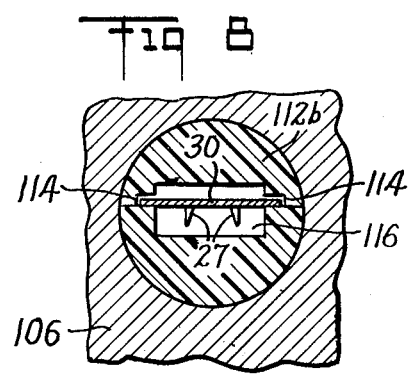

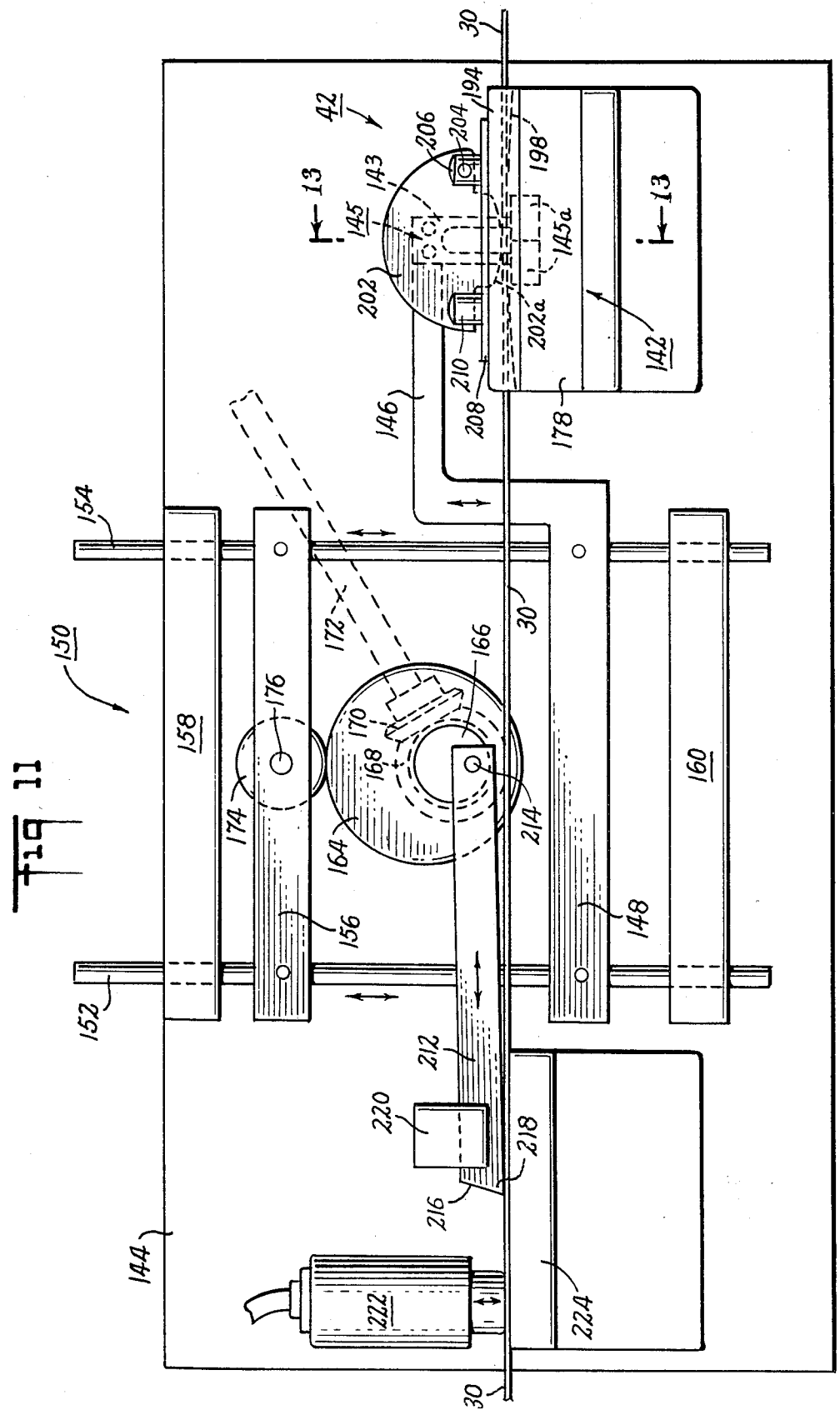

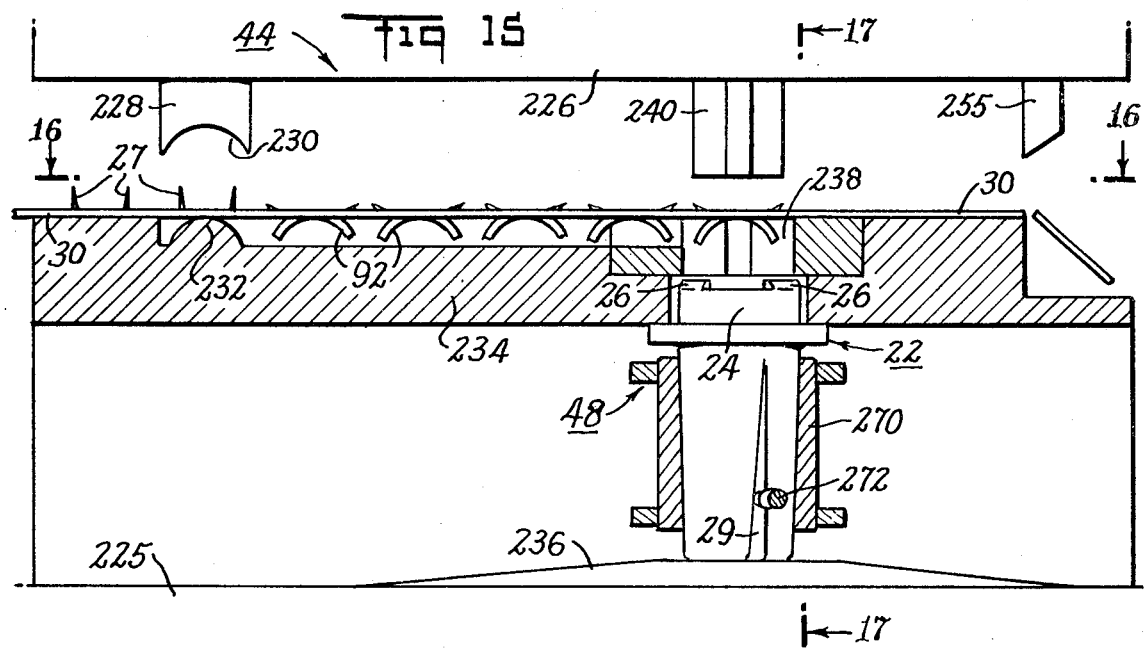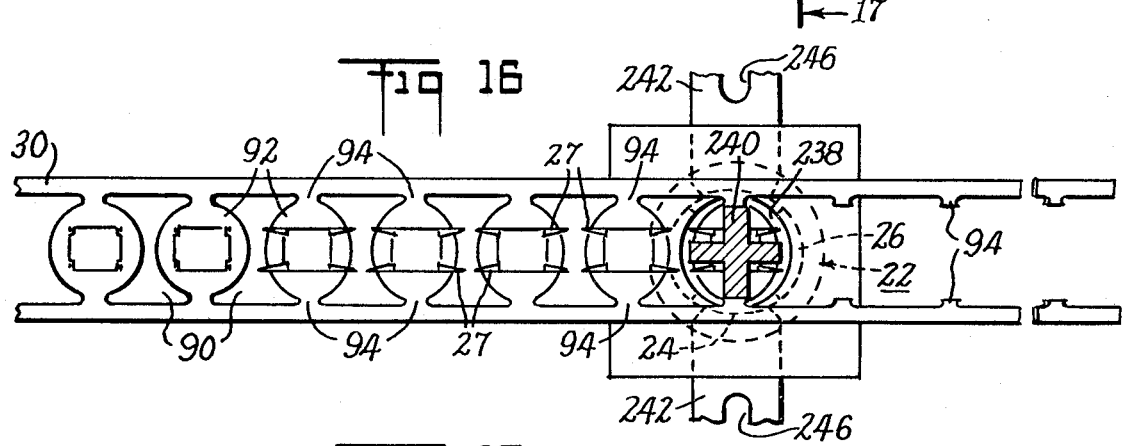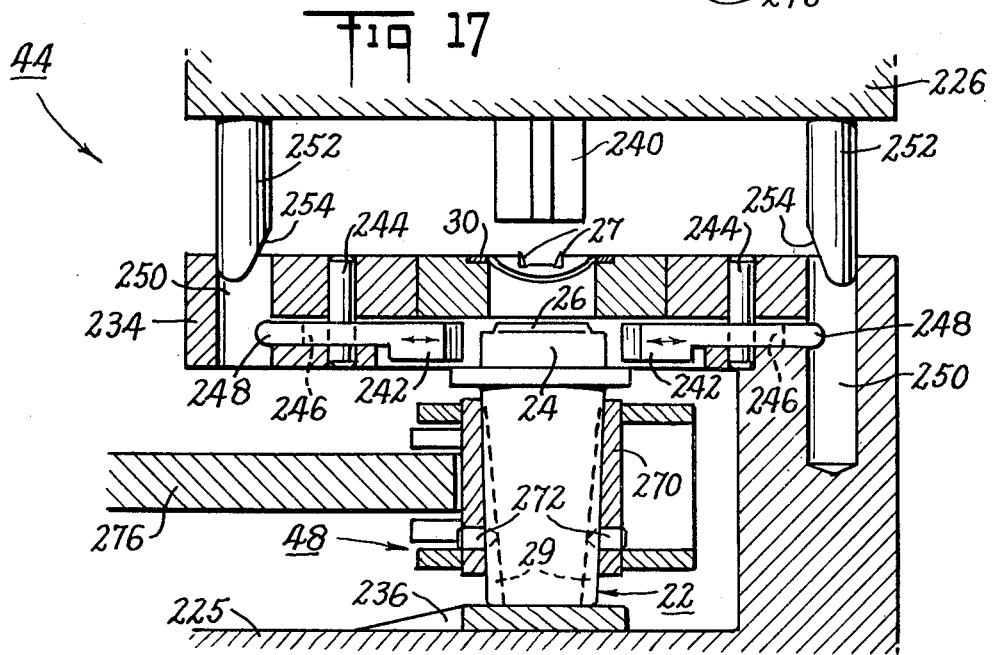

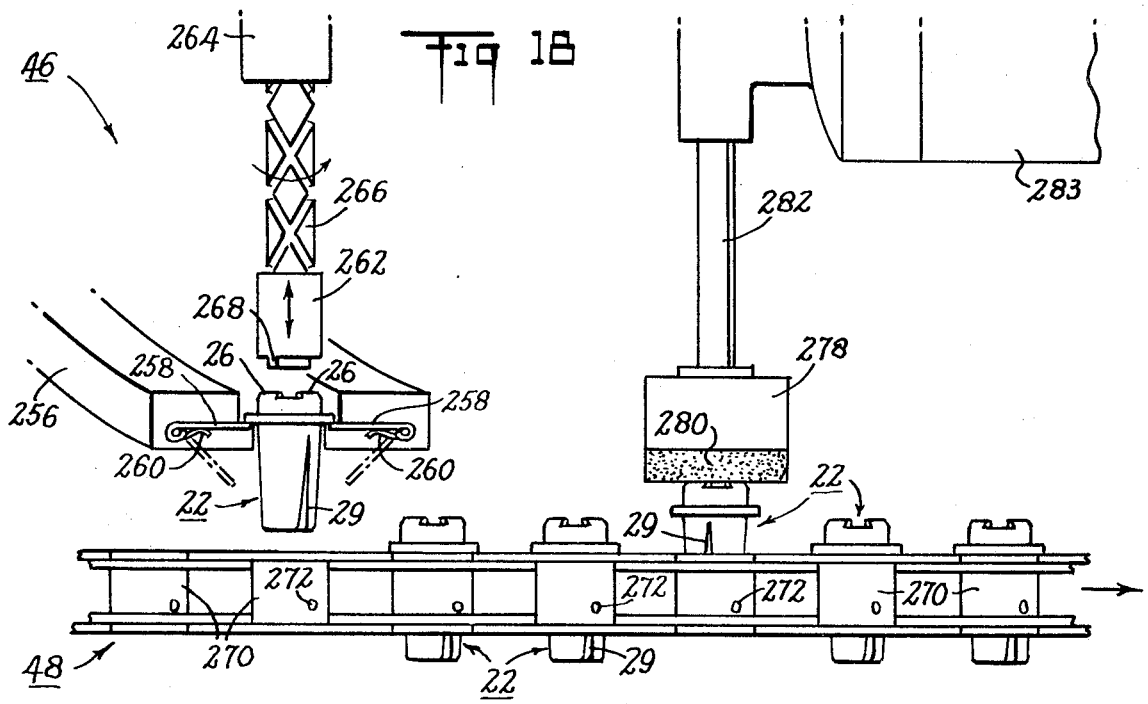
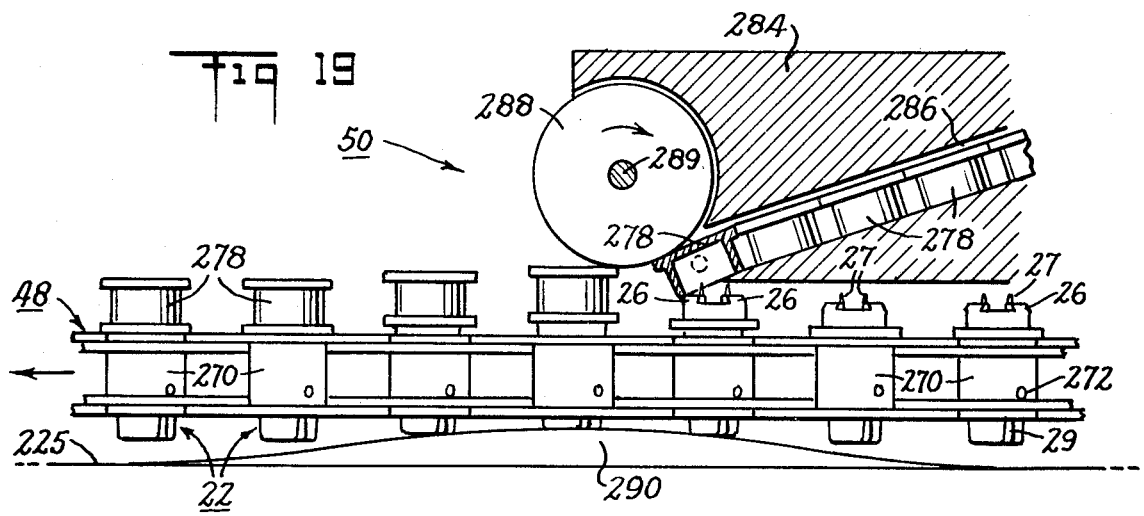
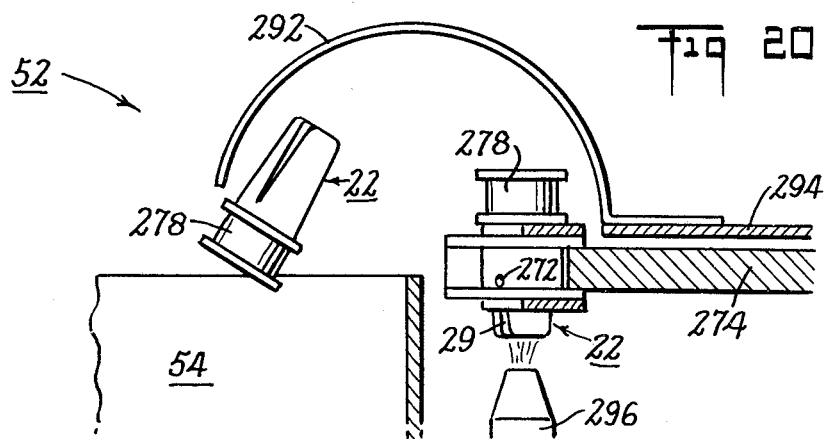

United States Patent Office 3,510,933
Patented May 12, 1970

3,510,933
APPARATUS AND METHOD FOR CONTINUOUSLY FORMING INTRACUTANEOUS INJECTORS
Arthur S. Taylor, Spring Valley, and Ellsworth R. Sandhage, Pearl River, N.Y., assignors to American Cyanamid Company, Stamford, Conn., a corporation of Maine
Filed May 26, 1967, Ser. No. 641,639
Int. Cl. B23p 17/00, 23/04
U.S. Cl. 29—417       24 Claims

ABSTRACT OF THE DISCLOSURE

Herein disclosed are an apparatus and method for continuously forming disposable intracutaneous injectors. The apparatus comprises a press for forming scarifying plates on a continuous strip, an ultrasonic bath, a dryer, an applicator for applying a biologically-active liquid to the plates and apparatus for feeding and assembling the plates on handles.

The strip is intermittently fed by predetermined increments through the apparatus and the various mechanisms of the apparatus are coordinated with the rate of feed of the strip and with each other to produce the finished intracutaneous injector.

BACKGROUND OF THE INVENTION

The present invention relates to the continuous and automated manufacture of intracutaneous injectors of a type whose structure and utility have been fully disclosed in U.S. Pat. No. 3,246,647, assigned to the assignee of the present invention.

Referring to FIG. 3, the intracutaneous injector comprises a handle 22 having a base portion 24 with a pair of raised flanges 26 extending inwardly and spaced from the base portion to form channels 26a. A scarifying plate 28 is secured to handle by fitting under channels 26a in flanges 26. Sharp prongs 27 extend perpendicularly from plate 28. For reasons which will be clear from the following specification, the handles 22 used in the present invention have a pair of longitudinal indexing grooves 29 disposed on either side thereof.

The disposable nature of the intracutaneous injector described above requires that it be readily and inexpensively manufactured in large quantities. However, the manufacture of such an injector entails a number of separate and distinct operations which in the past have been largely effected by hand. Production under such conditions is obviously severely limited and unsuited to the mass production requirements of a disposable device.

Accordingly, representative objects of the present invention are to provide an apparatus and method for the automatic and continuous manufacture of intracutaneous injectors in a rapid and efficient manner.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

SUMMARY OF THE INVENTION

The present invention relates to an apparatus and method for continuously forming intracutaneous injectors of the type illustrated in FIG. 3 and discussed above. By means of the invention, the numerous hand operations of the prior art are eliminated and injectors can be rapidly and inexpensively mass produced.

According to the invention, a continuous strip of material suitable for forming scarifying plates (preferably a metallic strip such as stainless steel) is intermittently fed by predetermined increments through an automated apparatus which performs a number of operations at spaced points along the path of travel of the strip. The strip remains integral throughout the numerous operations necessary to produce a scarifying plate and then the plate is detached and assembled in a handle to form the intracutaneous injector described. By maintaining the strip integral throughout manufacture, the problems involved in handling small individual scarifying plates are eliminated and complete automation is easily and effectively attained.

Referring to FIG. 1, the strip 30 is drawn from a supply reel 32 and fed into the apparatus by a feed mechanism shown generally at 34. Feed mechanism 34 intermittently feeds strip 30 by predetermined increments under a scarifying plate press 36 which acts in coordination with feed mechanism 34 to stamp successive increments of strip 30 and form integral scarifying plates thereon. From press 36, strip 30 is fed through an ultrasonic bath 38 where it is cleaned in preparation for adherence of a biologically-active liquid to the prongs of the scarifying plate. Strip 30 next passes through a dryer 40 where any cleaning medium remaining on the scarifying plates from their passage through bath 38 is removed. Biologically-active liquid is applied to the prongs projecting from each scarifying plate in an applicator shown generally at 42, the construction of which will be described in greater detail below. Representative examples of biologically-active materials which may be applied in liquid form to intracutaneous injectors by means of the apparatus and method of the invention are described in U.S. Pat. No. 3,034,507, assigned to the assignee of the present invention. Further examples of biologically-active materials which may be used in the invention are set forth in previously identified U.S. Pat. No. 3,246,647. From applicator 42 strip 30 is fed under an assembly press 44 where each scarifying plate is detached from strip 30 and assembled with a handle to form a finished intracutaneous injector.

The apparatus for supplying handles to be assembled with the scarifying plate is shown in FIG. 2. Handles fed from a supply 46 are carried by a conveyor 48 having an intermittent feed coordinated with the feed of strip 30. Conveyor 48 passes under press 44 where assembly occurs. The assembled intracutaneous injectors are then carried by conveyor 48 to a capping mechanism shown generally at 50 where a cap is applied to the base portion 24 of the handle 22 (FIG. 3) to guard against contamination of the scarifying plate. From capping mechanism 50, the assembled and capped injectors are carried by conveyor 48 to an ejection mechanism 52 to be collected in a bin or container 54.

In the present invention all operations must be synchronized to the movement of a continuous strip. Accordingly, the rate of operation of each of the individual mechanisms comprising the apparatus of the invention must be synchronized or coordinated both with the rate of movement of the strip and the rate of operation of each of the other mechanisms. The apparatus thus operates as a unitary synchronized mechanism for mass producing these intracutaneous injectors.

BRIEF DESCRIPTION OF THE DRAWINGS

For a fuller understanding of the nature and objects of the invention, reference should be had to the following detailed description taken in connection with the accompanying drawings in which.

FIG. 1 is an overall front, somewhat schematic, view of the apparatus of the invention.

FIG. 2 is a top plan view taken along line 2—2 of FIG. 1 illustrating the apparatus which feeds handles into position under the assembly press and which caps and ejects the completed intracutaneous injector.

FIG. 3 is an enlarged perspective view of an intracutaneous injector made by the apparatus and method of the invention.

FIG. 4 is a front view partly in section of the feed mechanism and scarifying plate press of the invention.

FIG. 5 is a top view of the strip used in making scarifying plates as it appears at different stages of passage through the scarifying plate press.

FIG. 5A is an enlarged fragmentary view of the strip of FIG. 5 showing a partially completed scarifying plate and illustrating by shading the portions sheared and bent to produce the prongs.

FIG. 6 is an edge view of the strip of FIG. 5

FIG. 7 is a sectional view in elevation of the ultrasonic bath of the invention.

FIG. 8 is an enlarged fragmentary sectional view of the strip in the ultrasonic bath taken along line 8—8 of FIG. 7.

FIG. 9 is a sectional view in elevation of the dryer with the strip passing therethrough.

FIG. 10 is an enlarged sectional view taken along line 10—10 of FIG. 9.

FIG. 11 is a front view of the applicator of the invention.

FIG. 15 is a front view partly in section of the assembly press of the invention as viewed along line 15—15 of FIG. 2.

FIG. 16 is a top view partly in section taken along line 16—16 of FIG. 15.

FIG. 17 is a sectional view taken along line 17—17 of FIG. 15.

FIG. 18 is a view of the apparatus taken along line 18—18 of FIG. 2.

FIG. 19 is a view of the capping mechanism taken along line 19—19 of FIG. 2.

FIG. 20 is a view of the ejection mechanism taken along line 20—20 of FIG. 2.

Similar reference characters refer to similar parts throughout the several views of the drawings.

DESCRIPTION OF THE PREFERRED EMBODIMENTS

Feed mechanism

Figure 12:
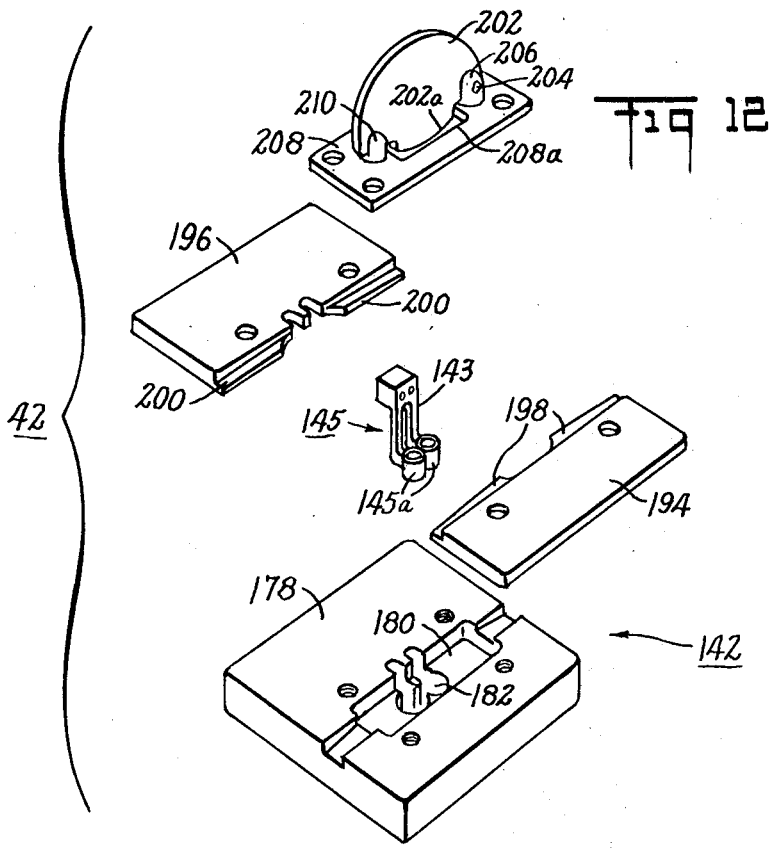
FIG. 12 is an exploded perspective view of a portion of the applicator.

Referring to FIGS. 1 and 4, feed mechanism 34 comprises a support 56 slidably mounted on a pair of guide rails 58 and 60 attached to the apparatus frame 62. Support 56 is biased toward scarifying plate press 36 by a helical spring 64 threaded over rail 58. Strip 30 rests on a shelf portion 66 of support 56 projecting under a clamp member 68 pivotally mounted on support 56 by pin 70. An arm 72 projecting from support 56 carries a wheel 74 which rests against a camming surface 76 of a reciprocating stamping head 78 of press 36. Pneumatic or electrically operated plungers 80 and 82 are disposed respectively over clamp member 68 and a portion of strip 30 resting on the apparatus frame 62. Plungers 80 and 82 may be actuated by appropriate limit switches which are synchronized with the movement of stamping head 78.

Feed mechanism 34 operates as follows, as seen in FIGS. 1 and 4. As stamping head 78 is moved toward strip 30, plunger 82 moves downwardly to clamp strip 30 to the apparatus frame 62. Simultaneously, as a result of the camming action between surface 76 and wheel 74, support 56 moves to the right away from press 36 against the biasing force of spring 64 to the position shown in dotted lines in FIG. 4. As stamping head 78 reaches the bottom of its throw and begins to reciprocate back to its upper position shown in FIG. 4, plunger 82 moves upwardly to release strip 30. Simultaneously plunger 80 moves downwardly causing clamp 68 to pivot in a counter-clockwise direction against strip 30, clamping it against shelf 66. The biasing of spring 64 moves support 56 toward press 36 for camming surface 76 is now moving upwardly with stamping head 78. Since strip 30 is gripped between clamp 68 and shelf 66 it is drawn to the left a distance equal to the distance moved by clamp 68. This distance constitutes the increment I (FIG. 5) by which strip 30 is intermittently fed through press 36. As stamping head 78 reaches its upper position, plunger 80 also moves upwardly releasing clamp 68; the above described cycle then recommences, thus effecting an intermittent feed of strip 30.

Scarifying plate press

Still referring to FIGS. 1 and 4, strip 30 is supported under press 36 on an anvil 81. Stamping head 78 of press 36 reciprocates toward and away from anvil 81 as shown. As previously noted, the rate of reciprocation of press 36 controls the rate of feed mechanism 34 so that the two act in synchronism.

A plurality of punches are supported at spaced points on stamping head 78. Punch 83 is substantially hexagonal in cross section and upon reciprocation of head 78 produces a substantially hexagonal aperture 84 in strip 30 as shown in FIG. 5. A substantially hexagonal guide punch 86 is spaced from punch 83 on head 78 by the length of one increment I (FIG. 5). Guide punch 86 is slightly longer than punch 83 so that upon reciprocation of head 78 it leads punch 83 and enters previously stamped aperture 84a thus serving to keep strip 30 accurately aligned for stamping.

Punch 88 is supported on stamping head 78 is position to stap strip 30 between each hexagonal aperture 84 produced by punch 83. The configuration of punch 88 is such as to produce an hourglass-like aperture 90 in strip 30 as shown in FIG. 5. The hourglass-like apertures in strip 30 define a land 92 surrounding each hexagonal aperture 84, and each land 92 remains integrally attached to strip 30 through tab portions 94.

Punch 96 is supported on stamping head 78 in position to stamp through each hexagonal aperture 84 as strip 30 is incrementally fed through the apparatus. Punch 96 is rectangular in cross-section and has substantially the same length L and width W (FIG. 5A) as the hexagonal apertures 84 produced by punch 83. The face 98 of punch 96 is peaked so that upon its passage through each aperture 84, material adjacent two opposed pairs of intersecting edges of aperture 84 is simultaneously sheared and bent downward to produce prongs 27 projecting from the plane of strip 30, as shown in FIG. 6. Referring to FIG. 5A, the shearing action of punch 96 occurs along dotted lines 101 and the shaded portions are bent downwardly to form prongs 27 which remain integral with land 92 along dotted lines 102.

Preferably, a second guide punch 103 (FIG. 4) which functions in a manner similar to guide punch 86 is interposed between punch 88 and punch 96 to help maintain strip 30 in proper alignment.

Thus, as strip 30 moves incrementally under press 36 there are stamped thereon a plurality of integral scarifying plates, each comprising a land 92 having integral prongs 27 projecting from the plane thereof.

Ultrasonic bath

Referring to FIG. 7, ultrasonic bath 38 comprises a tank 104 which is divided by a partition 106 into two compartments 108 and 110. Bushings 112a, 112b and 112c, each having a cross-section as shown in FIG. 8, are fitted in the walls of tank 104 and partition 106. Strip 30 is supported during its passage through ultrasonic bath 38 by grooves 114 in each bushing. Each bushing also contains an enlarged central opening 116 to permit passage of the prongs 27 projecting from the plane of strip 30. The bushings are preferably formed of a material having low coefficient of friction such as polytetrafluoroethylene to reduce the drag exerted on strip 30. Ultrasonic transducers 124 in compartment 108 and 110 function in a well-known manner to facilitate an efficient cleaning of the strip.

An inlet 118 connected to bushing 112c (FIG. 7) conveys a fluid cleaning medium from an outside source (not shown) into compartment 108. The cleaning medium may comprise water, preferably at an elevated temperature, or any other fluid known in the art to be suitable for cleaning the material from which strip 30 is made in preparation for application of a desired biologically-active material. The height of wall 106 is lower than the walls of the tank so that the fluid cleaning medium will spill over from compartment 108 to compartment 110 as is shown in FIG. 7. In addition, a portion of the fluid entering bushing 112c from inlet 118 is diverted away from compartment 108 and exits from bushing 112c outside the wall of tank 104 where it is caught by trap 120. The fluid in compartment 110 exits through bushing 112a where it is caught by trap 122.

It can be seen that the flow of fluid cleaning medium through ultarsonic bath 38 runs counter to the direction of movement of strip 30. Accordingly, strip 30 is first bathed by the fluid exiting through bushing 112a; next by the fluid within compartment 110; next by that in compartment 108; and finally by that exiting from bushing 112c. Strip 30 is thus thoroughly bathed by four changes of fluid in its passage through ultrasonic bath 38, each change being cleaner than the one preceding.

The dryer

Referring to FIG. 1, dryer 40 comprises a heater 126 which is preferably of the gas burner type known to those skilled in the art; an electrical heater may, however, be used. Heater 126 exhausts through a chimney 128 containing an elbow portion 130 which is slotted, as shown in FIG. 9, to permit passage of strip 30 therethrough. Strip 30 is preheated in passing through elbow portion 130 by the exhaust of heater 126 to accelerate the drying process.

A heated gas, most commonly air, is conveyed from heater 126 through conduit 132 to a drying compartment 134 shown in greater detail in FIG. 9. A channel 136 through drying compartment 134 permits passage of strip 30 over a manifold 138 into which the heated gas is conveyed by conduit 132. Strip 30 is supported within grooves 139 cut into the sides of channel 136. A plurality of vents 140 are provided in manifold 138 adjacent channel 136. As shown in FIG. 10, vents 140 are spaced so that each underlies at least one prong at each stage during the incremental passage of strip 30 through drying compartment 134. The upward flow of heated gas through vents 140 serves to wipe or dry off the remainder of any fluid cleaning medium adhering to the prongs from bath 38. The cleaned and dried prongs are then in condition for application of biologically-active liquid.

The applicator

Generally, with reference to FIG. 11, applicator 42 comprises a tank 142 mounted on a vertical backing plate 144 and containing the liquid to be applied to the prongs projecting from strip 30. A dipper 145 including a suspended pair of cup-like receptacles 145a (FIG. 12) is supported for reciprocation within tank 142.

Figure 13:
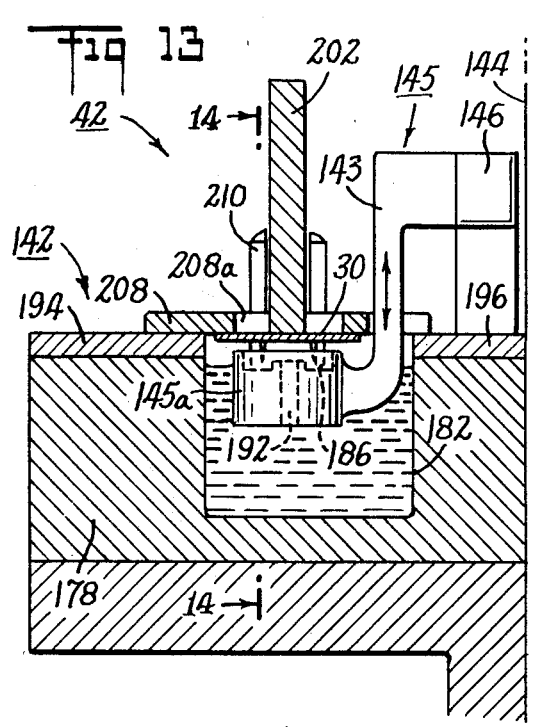
FIG. 13 is an enlarged sectional view taken along line 13—13 of FIG. 11.
Figure 14:
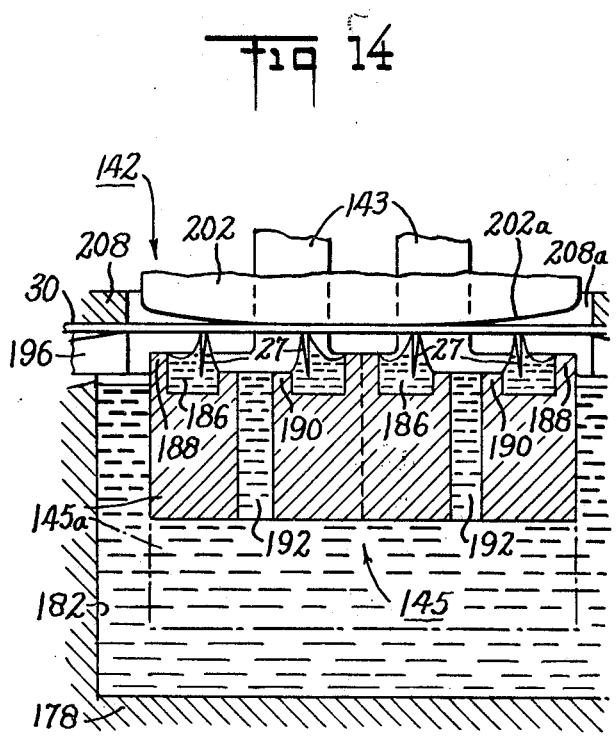
FIG. 14 is an enlarged detail in section of the dipper taken along line 14—14 of FIG. 13 and illustrating the application of liquid to the prongs of a scarifying plate.

As shown in FIGS. 13 and 14, upon reciprocation of dipper 145, liquid within tank 142 fills the cup-like receptacles 145a which upon upward movement wets the eight prongs 27 projecting from two scarifying plates on strip 30.

The dipper 145 is reciprocated by way of a vertically reciprocating assembly generally indicated at 150 to which it is connected. Thus arm 143 connects dipper 145 to a beam 146 which is connected to a cross-bar 148 forming a part of the vertically reciprocating assembly 150. Assembly 150 comprises two rods 152 and 154 held in parallel relation by cross-bars 148 and 156. Rods 152 and 154 are slidably supported within brackets 158 and 160 which are affixed to backing plate 144. A cam 164 eccentrically mounted on backing plate 144 by way of a shaft 166 is driven by gear 168 secured to shaft 166 behind backing plate 144. Gear 168 in turn is driven by a bevel gear 170 connected to a shaft 172 which is driven by a suitable motor (not shown). A follower 174 is mounted on a shaft 176 connected to cross-bar 156; this follower rides on the surface of cam 164. It can be seen that as cam 164 rotates eccentrically it causes follower 174 and associated assembly 150 to reciprocate vertically within brackets 158 and 160 as shown. Such reciprocation is transferred to dipper 145 by cross-bar 148, beam 146 and arm 143 causing reciprocation of dipper 145 toward and away from strip 30 in tank 142.

Specifically, referring to FIG. 12, tank 142 comprises a base 178 containing a reservoir 180 for the liquid. A well 182 corresponding to the shape of dipper 145 is formed in the bottom of reservoir 180 and dipper 145 slidingly fits therein as shown in FIG. 13. Dipper 145 includes two cup-like receptacles 145a (FIG. 12) and, as shown in FIG. 14, each receptacle 145a includes a cavity 186 bounded by a high outer peripheral wall 188 and a low inner peripheral wall 190.

As dipper 145 is reciprocated toward the prongs 27, liquid from well 182 fills each receptacle 145a, and each receptacle 145a brings that liquid into contact with the four prongs projecting from one scarifying plate (FIG. 14). The difference in height of outer peripheral wall 188 and inner peripheral wall 190 serves to flatten the convex meniscus normally assumed by the liquid. Thus, a substantially planar liquid surface is presented to each prong so that a controlled depth of coating of the prongs can be achieved. Excess liquid in the cavities 186 drains out through drainage opening 192.

Referring to FIG. 12, a pair of cover plates 194 and 196 fit over base 178 to cover reservoir 180 and well 182. Flanges 198 and 200 on plates 194 and 196 project over reservoir 180 to overlap the strip 30 passing therethrough and serve as a guide for its passage through the tank.

The liquid should be evenly applied to all of the prongs of the strip but the strip has a tendency to twist during passage through the tank; such twisting may result in uneven coating. To prevent such twisting of the strip, a weight 202 (FIGS. 11 and 12) is pivotally supported on a pin 204 secured to post 206 on support plate 208. A bifurcated guide post 210 on plate 208 maintains weight 202 in proper alignment with the path of travel of strip 30. The rounded bottom surface 202a of weight 202 extends through an opening 208a in plate 208. Plate 208 is secured to cover plates 194 and 196 so that weight 202 extends through opening 208a in position to rest on strip 30 (FIGS. 13 and 14). This prevents the strip from twisting and thus insures even application of the liquid to all prongs.

As described above, press 36 forms only one scarifying plate per reciprocation as strip 30 moves thereunder in single increment stages. However, as shown in FIGS. 13 and 14, each time dipper 145 with its two suspended receptacles 145a completes its upward movement, all prongs on each of two scarifying plates on strip 30 are immersed in liquid. Such immersion should only occur once for each prong to prevent the buildup of excess liquid. It can be seen therefore that the rate of operation of the applicator must be ½ the rate of reciprocation of press 36 in order for the two to act in coordination on strip 30. In addition, strip 30 must move through the applicator in double increment stages to prevent duplicate application of liquid to the prongs. To accomplish this and to maintain strip 30 moving through the apparatus, strip 30 is fed through applicator 42 by a pusher arm 212 (FIG. 11) eccentrically connected to shaft 166 by pin 214. The other end 216 of pusher arm 212 is free and beveled so that the tip 218 thereof engages the edge of an aperture in strip 30. A guide 220 projecting from backing plate 144 maintains arms 212 in alignment with the path of travel of strip 30. As seen in FIG. 11 when shaft 166 rotates, arm 212 reciprocates and tip 218 sequentially engages apertures in strip 30 spaced by two increments to pull strip 30 through applicator 42 at the desired rate of two increments per reciprocation of dipper 145.

Momentarily in the operation of the apparatus, the coordinated but not necessarily synchronized movements effected on strip 30 by feed mechanism 34 and pusher arm 212 may cause the length of strip 30 between press 36 and applicator 42 to vary. To prevent binding of strip 30, a slack loop 221 is provided in strip 30 as shown in FIG. 1 to compensate for such length variations.

Preferably a plunger 222 similar to plungers 80 and 82 (FIG. 1) is positioned over strip 30 adjacent end 216 of arm 212. As arm 212 begins its rearward stroke, an appropriate limit switch (not shown) actuates plunger 222 to clamp strip 30 against a ledge 224 projecting from backing plate 144. Thus clamped, strip 30 is secured against movement by arm 212 during its rearward stroke. Plunger 222 is de-actuated as arm 212 again begins a forward stroke thus enabling strip 30 to be moved the desired two increment distance.

In applications where the liquid employed in tank 142 requires refrigeration to retain potency, an appropriate refrigeration mechanism may be placed under or around tank 142.

The assembly press

Referring to FIGS. 1, 2 and 15, assembly press 44 supported on table 225 reciprocates a platen 226 toward and away from the path of travel of strip 30. As shown in FIG. 1, the direction of travel of strip 30 is reversed prior to passing under press 44 so that the orientation of the prongs 27 is upwardly toward platen 226 (FIG. 15).

Where the length of strip 30 between applicator 42 and press 44 requires it, a feed mechanism similar to feed mechanism 34 and actuated by a camming surface forming a part of platen 226 (similar to camming surface 76 on stamping head 78 as seen in FIG. 4) may be positioned to feed strip 30 into press 44. The rate of operation of press 44 and any associated feed mechanism is synchronized with the rate of operation of press 36 since both act on the same moving strip.

Referring to FIG. 15, a die 228 having a concave face 230 is carried by platen 226; upon reciprocation thereof against convex protrusion 232 on base 234, it deforms each land 92 (FIG. 16) on strip 30 to an arcuate shape. The deformation of land 92 to an arcuate shape decreases its diameter and thus facilitates the insertion thereof under the flanges 26 of handle 22 (FIG. 3).

As shown in FIG. 15, handles 22 are intermittently fed into position under platen 226 of press 44 by conveyor 48 in a manner more fully described below. Preferably, each handle is raised up by a protrusion 236 on table 225 when it reaches the point where insertion of a scarifying plate is to be effected. The raised handle 22 is thus positioned with its flanges 26 beneath opening 238 of base 234. An insertion punch 240 is supported on platen 226 directly over opening 238. Punch 240 has a cruciform cross section so that it may press down each scarifying plate carried by strip 30 without damaging or contaminating the prongs 27 projecting therefrom, as shown most clearly in FIG. 16. As press 44 reciprocates in synchronization with the feed of strip 30, punch 240 detaches each scarifying plate by shearing through the tab portions 94. Once detached from strip 30, each scarifying plate is carried by punch 240 down onto handle 22 where the deformed lands 92 are pressed under the flanges 26. The pressure of punch 240 causes land 92 to straighten to its original flat shape, thus securing it to handle 22 under flanges 26.

Preferably, a pair of pincers 242 are reciprocally mounted within base 234 adjacent opening 238 as shown in FIG. 17. Pins 244 passing through grooves 246 in each pincer 242 confine them to linear movement toward and from the handles in opening 238. An extension 248 of each pincer 242 protrudes into passageways 250 in base 234. A pair of camming rods 252 supported on platen 226 in alignment with passageways 250 move into the passageways upon downward movement of the platen. As each camming rod 252 moves downwardly, beveled surfaces 254 thereon cam extensions 248 of each pincer 242 against base portion 24 of handle 22. The pressure of pincers 242 thus deforms base portion 24 and spreads flanges 26 to allow for insertion of the lands 92 thereunder by punch 240. As platen 226 and pincers 242 move away from base 234, flanges 26 move back to their original position to secure the plate in the handle, which is released from recess 238 to be replaced by the next succeeding handle on conveyor 48.

As shown in FIG. 15, a shearing punch 255 is preferably supported on platen 226 at a point spaced from punch 240. Upon reciprocation of press 44, punch 255 shears the scrap remainder of strip 30 into small pieces as shown in FIG. 15, to facilitate disposal.

Handle supply

Referring to FIGS. 2 and 18, conveyor 48 supported on table 225 feeds handles into position under assembly press 44. Handles are fed from a supply source 46— which may be a vibratory hopper—thence down a chute 256 to a position over conveyor 48 where they are supported by a pair of grippers 258. As shown in FIG. 18, each gripper 258 is biased by a spring 260 which permits it to pivot toward conveyor 48 upon the application of pressure.

A ratchet-operated plunger 262 is reciprocally supported over grippers 258. Plunger 262 operates in a manner similar to a ratchet screw driver; thus, as it is moved through collar 264 by, for example, pneumatic pressure, the configuration of the inner surface of collar 264 interacts with track 266 causing plunger 262 to rotate downwardly as will be apparent from FIG. 18. A projection 268 on the bottom of plunger 262 finally rests between flanges 26 as plunger 262 nears completion of its downward movement to impart a twist to handle 22 therebeneath in chute 256. Plunger 262 is actuated by an appropriate limit switch (not shown) in synchronization with the intermittent movement of conveyor 48 so that it pushes each handle through grippers 258 and into a sleeve 270 on conveyor 48. As shown most clearly in FIGS. 15 and 17, indexing pins 272 project from the inner surface of each sleeve 270. Each handle 22 can only be fully inserted into a sleeve 270 when its indexing grooves 29 are aligned with the indexing pins 272. The twist imparted to each handle by plunger 262 serves to effect the proper inserting alignment. Indexing pins 272 are so positioned that the handles 22 are properly aligned in sleeves 270 for insertion of the scarifying plate by punch 240 as previously described with respect to FIG. 15.

Referring back to FIG. 2, conveyor 48 is driven intermittently in synchronization with the reciprocal movement of press 44 by a pair of sprockets 274 and 276 which in turn are driven by a suitable motor (not shown).

Occasionally a handle may not be properly aligned by plunger 262. Preferably, therefore, a spinning wheel 278, having a resilient face 280 such as sponge rubber and continuously driven through shaft 282 by a suitable motor 283, is positioned over the path of travel of conveyor 48 down the path from ratchet plunger 262 as shown in FIG. 18. As conveyor 48 progresses, any handle protruding upwardly from its sleeve 270 because of nonalignment with pins 272 will contact resilient face 280 of spinning member 278 and be spun into proper alignment.

Capping mechanism

Preferably, the assembled intracutaneous injectors are capped to protect the liquid on the prongs. To do this caps 278 (FIG. 19) of a suitable material such as polyethylene are fed from a supply chamber 280 such as a vibratory hopper (FIG. 2) down a chute 282 and into a guide block 284 shown most clearly in FIG. 19. Caps 278 slide along a passageway 286 through block 284 to a point over the path of movement of conveyor 48 and under a capping wheel 288 rotatably mounted on block 284 by a pin 289. As conveyor 48 advances under block 284, a protrusion 290 on table 225 causes each assembled intracutaneous injector to be raised within its associated sleeve 270 so that the leading edge thereof may catch the inner edge of a cap 278 as shown in FIG. 19. Continued movement of conveyor 48 over protrusion 290 causes each intracutaneous injector to be pressed into a cap 278 under the urging of capping wheel 288, which rotates to minimize friction and assure proper alignment of cap 278.

Ejection

As shown in FIG. 2, the assembled and capped intracutaneous injectors are carried by conveyor 48 to an ejection mechanism shown generally at 52. Ejection mechanism 52 comprises an arcuate deflector 292 (FIG. 20) fastened to a plate 294 extending over sprocket 274 and adjacent conveyor 48. Deflector 292 projects over the path of travel of conveyor 48. A nozzle 296 positioned under conveyor 48 directs a high pressure air stream against the bottom of each handle 22 as it passes under deflector 292. The high pressure stream ejects the assembled and capped intracutaneous injectors from sleeve 270 after which they strike deflector 292 and are thence directed to a bin or container 54.

The intracutaneous injectors collected in bin 54 may then be sterilized in bulk in an ethylene oxide sterilizer and subsequently packaged for shipment.

The invention accordingly comprises the several steps and the relation of one or more of such steps with respect to each of the others, and the apparatus embodying features of construction, combination of elements and arrangements of parts which are adapted to effect such steps, all as exemplified in the above detailed disclosure, and the scope of the invention will be indicated in the claims.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. Apparatus for continuously forming intracutaneous injectors comprising in combination:
   (A) feed means for intermittently feeding continuous strip in predetermined increments,
   (B) stamping means acting in coordination with said feed means for stamping each said increment to form a scarifying plate integral with said strip, each said scarifying plate comprising a land having prongs projecting therefrom,
   (C) applicator means acting in coordination with said feed means for applying biologically-active material to said prongs projecting from said strip comprising, a tank for containing said material, means supporting said strip over said tank, dipping means for placing said material in contact with said prongs, and drive means actuating said dipping means in coordination with said feed means to contact each said prong with said material,
   (D) means for deforming each said land to decrease its width to facilitate the insertion of each scarifying plate into a handle, and
   (E) assembly means for detaching each said scarifying plate from said strip and mounting same to the handle.

2. An apparatus as defined in claim 1 and including cleaning means acting on said strip prior to said applicator means to prepare said prongs for application of liquid.

3. An apparatus as defined in claim 1 and further including means for capping each said assembled scarifying plate and handle.

4. An apparatus as defined in claim 1 where said stamping means comprises an anvil for supporting said strip, a stamping head supporting a first substantially hexagonal punch disposed to stamp said strip at approximately the center of each said increment, a second punch of hourglass-like configuration disposed to stamp said strip between the hexagonal apertures produced by said first punch to form the land integral with said strip surrounding each said hexagonal aperture, and a third substantially rectangular punch disposed to stamp through each said hexagonal aperture and of a size sufficient to shear and bend material adjacent opposed pairs of intersecting edges of said hexagonal apertures to form said integral prongs.

5. An apparatus as defined in claim 4 including at least one guide punch on said stamping head.

6. An apparatus as defined in claim 1 wherein said cleaning means comprises an ultrasonic bath.

7. An apparatus as defined in claim 6 wherein said ultrasonic bath comprises a tank having first and second compartments, means permitting passage of said strip sequentially through said first and second compartments, means continuously feeding a cleaning medium to said second compartments, means permitting flow of said cleaning medium from said second compartment to said first compartment, and ultrasonic transducing means in each said compartment.

8. An apparatus as defined in claim 7 including means for bathing said strip with said cleaning medium prior to entry into said first compartment and upon exit from said second compartment.

9. An apparatus as defined in claim 6 including drying means acting on said prongs after passage of said strip through said ultrasonic bath.

10. An apparatus as defined in claim 9 wherein said drying means comprises a drying compartment through which said scarifying plates can pass, a manifold within said drying compartment adjacent the path of movement of said plates and having vents adjacent said prongs, and means conveying heated gas to said manifold whereby it escapes through said vents to dry said prongs.

11. An apparatus as defined in claim 1 wherein said dipping means comprises a dipper having at least one cuplike receptacle and disposed in said tank with said receptacle adjacent the path of movement of said prongs, and an arm connecting said dipper to an assembly mounted to reciprocally slide in a manner to reciprocate said receptacle toward and away from said prongs.

12. An apparatus as defined in claim 11 wherein said drive means comprises a cam follower on said assembly and a driven eccentrically mounted cam in contact with said cam follower for reciprocating said assembly.

13. An apparatus as defined in claim 1 including a weight pivotally mounted over said tank and positioned to rest on said strip to maintain said strip in alignment for even coating of liquid on said prongs.

14. An apparatus as defined in claim 12 including a pusher arm having one end eccentrically mounted to said cam, the other end being free and adapted to engage said strip when actuated by said cam in a direction away from said tank whereby said arm pulls said strip over said tank in synchronization with the reciprocation of said dipper.

15. Apparatus for continuously forming intracutaneous injectors comprising, in combination:
 (A) feed means for intermittently feeding continuous strip in predetermined increments,
 (B) stamping means acting in coordination with said feed means for stamping each said increment to form a scarifying plate integral with said strip and having prongs projecting therefrom.
 (C) applicator means acting in coordination with said stamping means for applying biologically-active material to said prongs projecting from said strip,
 (D) assembly means for detaching each said scarifying plate from said strip and mounting same to a handle, and
 (E) a conveyor passing under each said plate at the point of assembly thereof with said handle,
  (a) sleeves on said conveyor for holding said handles, each sleeve containing at least one indexing pin adapted to cooperate with a groove on each said handle,
  (b) means feeding said handles to said conveyor, and
  (c) a ratchet operated plunger in position to insert each said handle into one said sleeve and impart a twist thereto so as to align said groove with said indexing pin.

16. An apparatus as defined in claim 15 and further including means for ejecting each assembled handle and plate from each said sleeve.

17. An apparatus as defined in claim 1 for mounting each said scarifying plate on the handle having flanges adapted for securing said land thereunder, said deforming means comprising a die having a concave face reciprocally supported adjacent said strip in position to deform each said land to facilitate insertion thereof under said flanges, and said assembly means comprising support means spaced from said die for positioning each said handle, and an insertion punch reciprocally supported adjacent said support means in position to substantially simultaneously detach said deformed land from said strip, insert said land under said flanges and straighten said land to secure it to said handle, and means reciprocally actuating said die and said insertion punch in coordination with said stamping means.

18. An apparatus as defined in claim 17 and further including pincers in said support means actuated against said handle upon reciprocation of said insertion punch toward said land thereby elastically deforming said handle to space said flanges and facilitate insertion of said land thereunder.

19. A method of continuously producing intracutaneous injectors comprising, in combination, the steps of:
 (A) intermittently feeding continuous strip in predetermined increments,
 (B) forming on each said increment in coordination with said intermittent feed a scarifying plate, each said scarifying plate comprising a land having prongs projecting therefrom, and each said plate remaining integral with and being carried by said strip,
 (C) coating said prongs projecting from said strip with biologically-active material in coordination with said intermittent feed,
 (D) deforming each said land to decrease its width to facilitate the insertion thereof into a handle,
 (E) feeding a handle into position adjacent each said scarifying plate on said strip, and
 (F) detaching each said scarifying plate from said strip and substantially simultaneously securing same to one said handle.

20. A method as defined in claim 19 including the step of cleaning each said plate on said strip prior to said coating step.

21. A method as defined in claim 19 wherein each said scarifying plate is formed by:
 (A) stamping a substantially hexagonal aperture in each said increment;
 (B) stamping out portions of the material adjacent said hexagonal aperture to provide the land surrounding said hexagonal aperture and integral with said strip; and
 (C) stamping through said hexagonal aperture with a rectangular punch adapted to simultaneously bend and shear material adjacent opposed pairs of intersecting edges of said hexagonal aperture to convert same to a rectangular aperture of approximately the same length and width and produce integral prongs projecting from the plane of said strip.

22. A method as defined in claim 19 wherein said handle includes flanges for retaining said land thereunder in secured relation thereto and wherein said land is deformed to fit under said flanges and then straightened to substantially its original shape.

23. A method as defined in claim 22 wherein said land is first deformed with a die, and subsequently detached from said strip, inserted under said flanges and straightened substantially simultaneously by stamping with a punch.

24. A method as defined in claim 22 and including the step of elastically deforming said handle to space said flanges whereby insertion of said land is facilitated.

References Cited
UNITED STATES PATENTS

| | | | |
|---|---|---|---|
| 2,183,159 | 12/1939 | Chesley | 113—1 |
| 2,273,099 | 2/1942 | Gilbert | 113—119 |
| 3,034,507 | 5/1962 | McConnell et al. | 128—253 |
| 3,074,403 | 1/1963 | Cooper et al. | 128—253 |
| 3,123,212 | 3/1964 | Taylor et al. | 128—253 X |
| 3,246,647 | 4/1966 | Taylor et al. | 128—253 |
| 3,351,059 | 11/1967 | Kravitz | 128—253 |

CHARLIE T. MOON, Primary Examiner

D. C. REILEY, Assistant Examiner

U.S. Cl. X.R.

29—33, 208, 428, 458; 72—405; 113—1; 128—253